United States Patent [19]
Apicella et al.

[11] Patent Number: 5,409,717
[45] Date of Patent: Apr. 25, 1995

[54] PROCESS FOR PREPARING EXTENDED SHELF-LIFE BAGEL

[75] Inventors: Vincent Apicella, West Haven, Conn.; Andra J. Cullen, Lincolnwood, Ill.; Keith D. Forneck, Hanover Park, Ill.; Jill S. Quinn, Elmhurst, Ill.

[73] Assignee: Kraft Foods, Inc., Northfield, Ill.

[21] Appl. No.: 40,686

[22] Filed: Mar. 31, 1993

[51] Int. Cl.$^6$ ............................................. A21D 2/00
[52] U.S. Cl. ........................................ 426/19; 426/20; 426/24; 426/64
[58] Field of Search ..................... 426/19, 20, 24, 64

[56] References Cited

U.S. PATENT DOCUMENTS

| | | | |
|---|---|---|---|
| 2,615,810 | 10/1952 | Stone . | |
| 4,654,216 | 3/1987 | Carroll | 426/20 |
| 5,225,222 | 7/1993 | Cha et al. | 426/89 |
| 5,260,082 | 11/1993 | del Valle et al. | 426/549 |

FOREIGN PATENT DOCUMENTS 9104669  4/1991  WIPO .

OTHER PUBLICATIONS

Pyler, Baking Service & Technology, vol. I, 1973, Siebel Publishing Co.: Chicago, pp. 412–416.

Matz, Formulas and Processes for Bakers, 1987, Pan-Tech International, Inc.: McAllen, Texas, p. 306.

Tressler et al., Food Products Formulary, vol. 2, 1975, Avi: Westport, Conn., pp. 40–42, 211–212.

American Institute of Baking, "Novamyl® As A Crumb Softener For Bagels", Feb. 1991, Manhattan, Kansas.

Primary Examiner—Joseph Golian
Attorney, Agent, or Firm—Thomas R. Savoie; Thomas A. Marcoux

[57] ABSTRACT

Bagels with extended shelf life, preferably at least two weeks, and processes and formulations are disclosed. The process includes the steps of: preparing a dough by mixing flour, water, yeast, salt, and sugar and a freshness-promoting combination of starch-degrading enzyme, monoglycerides, and monosaccharide; holding the dough under conditions of temperature and humidity for a time effective to develop the dough as evidenced by the evolution of carbon dioxide and the degradation of at least a portion of the starch in the flour to oligosaccharides; forming the dough into bagel-shaped dough pieces; and boiling and baking the dough pieces. The freshness-promoting composition preferably includes one or more additional ingredients selected from the group consisting of: a gum, an oil, wheat gluten in addition to that present in the flour, and at least one egg component. It is also preferred to spray the bagel with a solution of an antimycotic following baking.

1 Claim, 3 Drawing Sheets

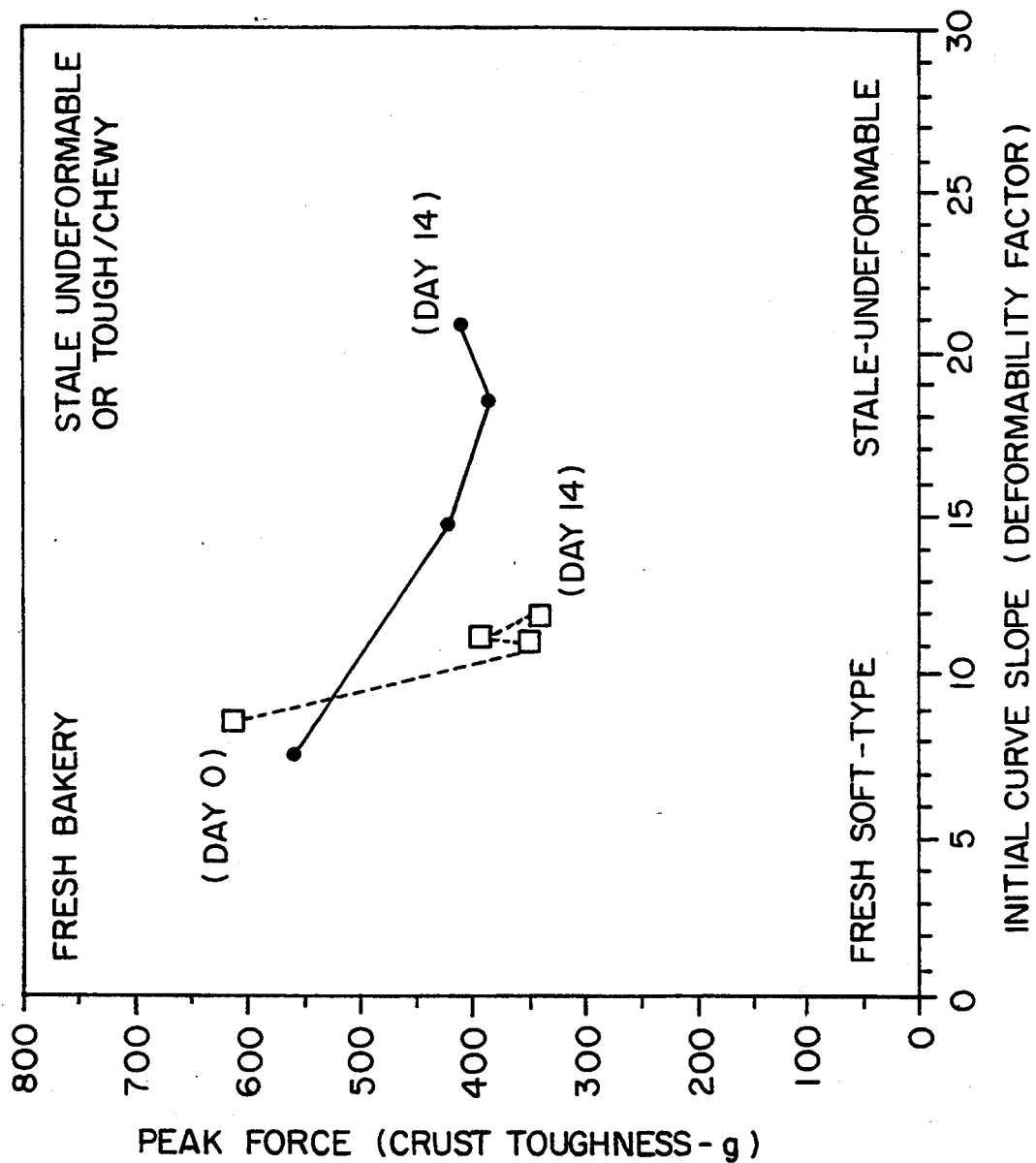

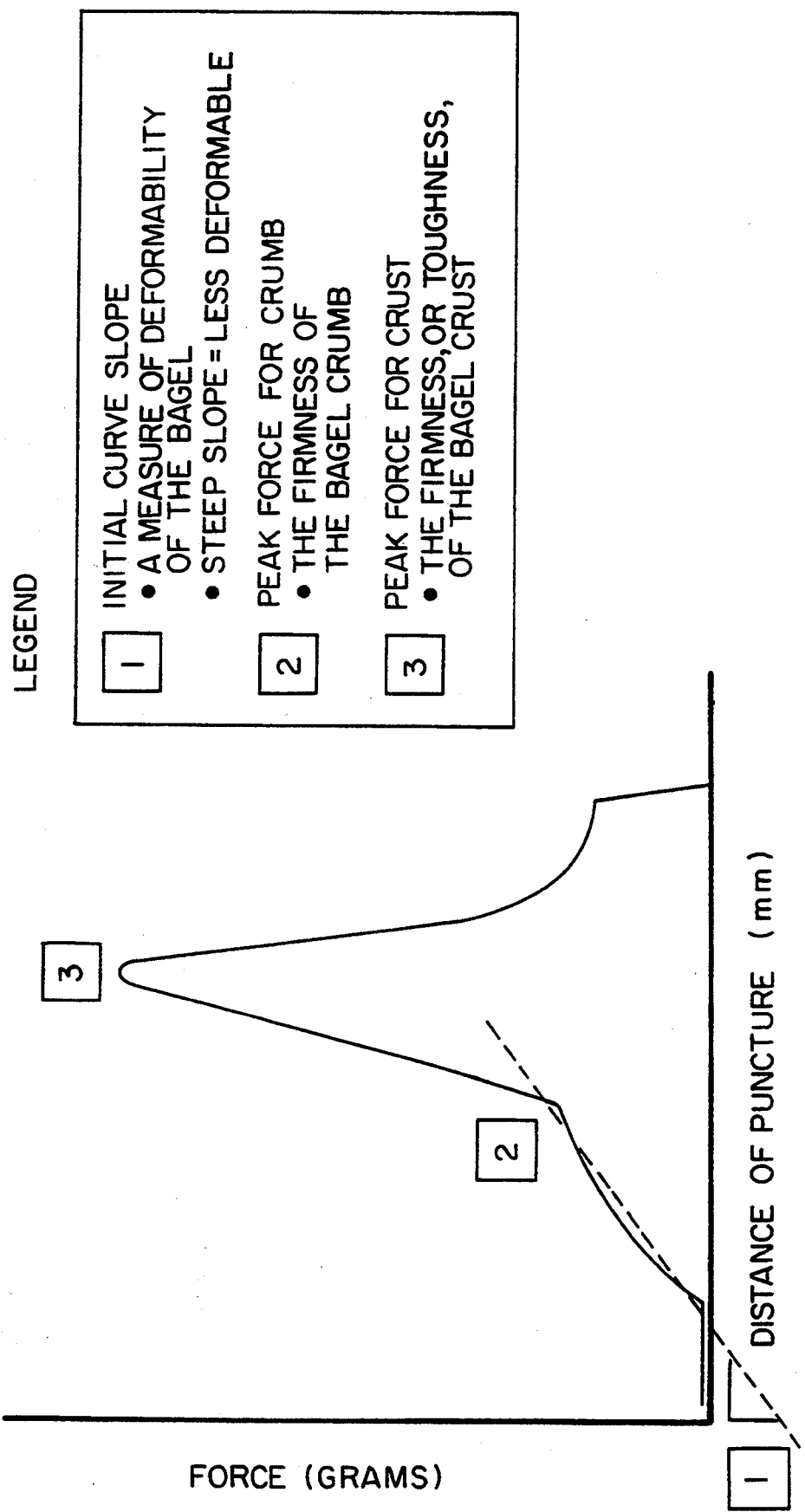

PROCESS FOR PREPARING EXTENDED SHELF-LIFE BAGEL

TECHNICAL FIELD

The invention relates to an improved bagel and a process for preparing it. The bagels of the invention maintain their original fresh characteristics over an extended period of time.

The preparation of bagels has traditionally been as much art as science, and the specific variations in formula and processing which lead to qualities which distinguish good ones from bad ones has eluded simple identification. Despite this, it has always been possible to distinguish a good bagel from a stale one. And, while techniques have been known for years to retard starch retrogradation, moisture loss, and other aspects of bread chemistry which have been related to staling, the art has yet to produce a bagel which meets the high expectations of bagel lovers when fresh and maintains enough of those qualities for reasonable periods of storage to assure consumption with minimal wastage.

BACKGROUND ART

The art of bagel preparation is ancient, as is the preparation of bread more broadly. The staling of bread has long been a problem, but it was not until the mid nineteenth century that it was clearly established that staling was not caused exclusively by moisture loss. In 1852, Boussingault reported that bread staled despite being sealed in a glass tube to prevent moisture loss. Staling has more recently been related to starch retrogradation, but this is also not the complete answer because crumb firmness is related to moisture content. Staling of bread is manifested in textural, visual and flavor changes—the net result is a strong negative correlation between staling and consumer acceptance.

There are many complex factors which impact on staling of bagels. The main ingredients include flour, water, yeast, sugar, and salt, in reasonable proportions to provide complete hydration with good forming and baking qualities. The intimate interaction of these dough components is affected by the mechanical action of mixing and the subsequent thermal effects of the production process. Other factors, not necessarily related to production, such as product storage temperature, moisture level, and packaging are interrelated and affect product freshness.

Irwin Stone, in U. S. Pat. No. 2,615,810, estimated that, in normal times, the annual wastage of stale bakery products accounted for from about 3.0 to about 4.7% of total wheat production. He postulated that the staling process could be divided into two parts: the crust which became soft and leathery due to the transfer of moisture from the crumb, and the crumb which becomes harder, tougher, more crumbly, and increasingly more opaque. He viewed the problem of crumb staling to be the most significant, and to alleviate it he taught the inclusion of a bacterial, starch-liquefying enzyme, such as α-amylase from *B. mesentericus* or *B. subtilis*, in the dough.

However, as reported by Olesen in WO 91/04669, the use of α-amylase for retarding staling has not become widespread—assumedly because the products of the hydrolysis are malto dextrins (with 20–100 glucose units in the molecule). These malto dextrins have a sticky consistency in themselves and are believed to result in the formation of a sticky or gummy crumb when used in excess. Olesen also reported that alleviation of the asserted adverse effects of α-amylase was addressed in U.S. Pat. No. 4,654,216 which suggested using pullanase (a debranching enzyme) in combination with the α-amylase. He further reported that monoglycerides have been suggested as antistaling ingredients which may be able to penetrate the amylose helical structure to retard retrogradation.

Given the review of antistaling technology prior to his efforts, however, Olesen presents what he asserts is a different approach—the use of an enzyme which is capable of retarding staling but does not result in the production of branched dextrins. The enzymes identified are exoamylases, such as α-amylases derived from various Bacillus strains. In his process, the enzyme is added to the dough in liquid form to a simple white pan bread formulation. The effectiveness of enzymes of this type is confirmed by a report issued by the American Baker's Institute entitled "Novamyl ® as a Crumb Softener for Bagels". However, the preparation of a bagel of high initial quality which is also shelf-stable in terms of microbiological stability and the texture of the crumb and the crust, as well as the textural contrast between them, has not been made available to the art.

There remains a need for a process to prepare bagels with an improved combination of quality and shelf stability.

BRIEF DESCRIPTION OF THE DRAWINGS

The invention will be better understood and its advantages will be better appreciated from the following detailed description, especially when read in connection with the accompanying drawings, wherein:

FIG. 2 presents a graphical comparison of instrumental texture assessment data for a bagel of preferred formulation (-□-) and one of the same formulation, but without the preferred enzyme (-●-); and FIG. 3 is a sketch of a representative instrumentally-derived test curve to help explain the test results.

DISCLOSURE OF THE INVENTION

Figure 1A:
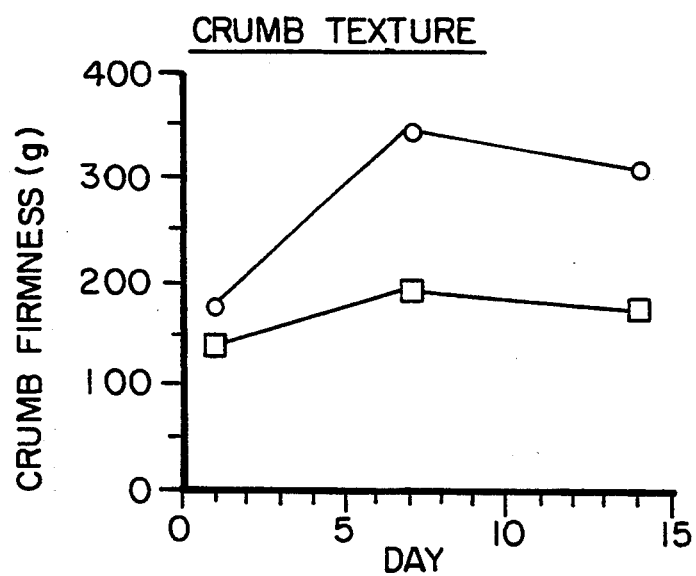
FIG. 1 presents a graphical summary of instrumental texture-measurement tests comparing an extended shelf-life bagel prepared according to the invention (-□-) and a commercial bagel not modified for extended shelf life (-○-)

It is an object of the invention to provide an improved process for preparing bagels having an extended shelf life.

It is another object of the invention to provide bagels with storage stability of at least two weeks and to also provide a process and formulation for preparing them.

It is yet another object of the invention to provide bagels which have initially good visual, textural and flavor characteristics and maintain these, especially in the contrast between crumb and crust firmness, for periods of two weeks and more, and to also provide a process and formulation for preparing them.

These and other objects are realized by the present invention which provides improved processes, improved formulations, and improved bagel products. The process of the invention includes the steps of: preparing a dough by mixing flour, water, yeast, salt, and sugar and a freshness-promoting combination of starch-degrading enzyme, monoglycerides, and monosaccharide, the ingredients being present in proportions effective to produce a formable dough; holding the dough under conditions of temperature and humidity for a time effective to develop the dough as evidenced by the evolution of carbon dioxide and the degradation of at least a portion of the starch in the flour to oligo saccharides; forming the dough into bagel-shaped dough pieces; boiling the dough pieces; and baking the dough pieces under conditions of temperature and humidity and for a time effective to brown the exterior of the dough pieces and set the internal crumb structure. In its more specific aspects the process can be further improved by the inclusion of one or more additional ingredients selected from the group consisting of: a gum, an oil, wheat gluten in addition to that present in the flour, and at least one egg component and a preservative, such as calcium proprionate. It is also preferred to spray the bagel with a solution of a preservative, such as potassium sorbate, following baking.

The bagel products of the invention are those prepared by the above procedures.

The composition for preparing extended shelf-life bagels of the invention includes the ingredients mentioned above in the discussion of the process, in both the broad and preferred aspects. The composition is preferably available as a combination of a dry premix of the water-soluble ingredients, a separate package including the fat-soluble ingredients (e.g., the mono- and diglycerides), and a separate package for the yeast.

Industrial Applicability

The invention will be described below with specific reference to a preferred embodiment wherein a preferred formulation is mixed, formed into a dough on conventional bagel forming equipment, and then further formed and baked according to traditional procedures. It will be recognized, though, that the invention has wider applicability. For example, the formulation can be varied to provide various flavors and exterior flavor applications, or to intentionally vary the texture to appeal to a different market segment than traditional bagels. Also, more technically-advanced, automated equipment can be substituted to the extent desired.

The process of the invention enables the preparation of bagels exhibiting freshness for extended periods of storage under ambient conditions, preferably for at least two weeks when suitably packaged and stored under ambient conditions (e.g., 20° C. and 760mm Hg). In the simplest terms, the process involves preparing a dough by mixing flour, water, yeast, salt, and sugar and a freshness-promoting combination of ingredients, all ingredients being present in proportions effective to produce a formable dough, holding the dough under conditions of temperature and humidity for a time effective to develop the dough, forming the dough into bagel-shaped dough pieces, boiling the dough pieces, and baking them to obtain the baked bagel product.

A dough is prepared according to the invention by mixing flour, water, yeast, salt, and sugar and a freshness-promoting combination of ingredients (explained below in more detail). While bakers have preferred flours and time-tested specifications for their operations, the preferred flour for the preparation of bagels of good quality with extended freshness is enriched high gluten wheat flour. All flour weights referred to herein are based on a moisture content of 14%, and the flours preferably have a protein content of from about 12 to 15%. The indicated percentages of the other ingredients are by weight and based on the weight of the flour as is the practice in baking recipes. The salt referred to is preferably sodium chloride, but can be replaced in whole or part by a suitable substitute, and is preferably employed in an amount of from about 1.5 to about 2.5%. The yeast is bakers yeast and can be employed in any physical form suitable for the purpose, e.g., dry, rehydrated, or fresh. It is preferred to either use fresh yeast or to hydrate it prior to incorporation into the dough at a level of from about 1.5 to about 3%, based on a yeast solids content of 70%.

The sugar referred to at this juncture is preferably one which will replace the conventionally employed sucrose. The preferred sugars are monosaccharides and are considered as part of the freshness promoting composition. These sugars are preferably added as high fructose corn syrup which provides water-binding and crumb-softening effects as will be noted below. Moreover, the high fructose corn syrup is preferred because its intense sweetness is effective to mask off-flavors which might otherwise be detected from added preservatives. High fructose corn syrup levels of from about 5 to about 8%, based on the weight of the flour and assuming a sugar solids content of 63%, are preferred.

The freshness-promoting composition will comprise several essential ingredients and may also include several optional, but preferred, ingredients. Among the essential ingredients are monoglycerides, monosaccharide, and starch-degrading enzyme. These ingredients will be employed in individual and combined amounts effective to provide at least 7 days, and preferably 14 days, stability from both excessive staling and mold and bacterial degradation when stored within a package which provides an effective barrier against moisture loss. Excessive staling would be any degree of staling which would result in an initial deformation curve slope (see FIGS. 2 and 3) of greater than 15 and a ratio of crust to crumb firmness, at any time up to the end of the 7 or 14 day period, of less than 2.0. It is preferred that the initial deformation curve slope be less than 14 and the ratio of crust to crumb firmness be greater than 2.5 throughout the period.

The composition will preferably include from about 0.25 to about 0.6% starch-degrading enzyme of the type which are known to the art, e.g., those identified in the references above, the disclosures of which are incorporated herein by reference. Preferred among these are the maltogenic enzymes identified by Olesen which are resistant to inactivation by heat up to temperatures of at least about 82° C. One enzyme identified there is "NOVAMYL ™ (a recombinant maltogenic amylase encoded by a DNA sequence derived from Bacillus strain NCIB 11837, described in U.S. Pat. No. 4,598,048)" having an exemplified activity of 1500 MANU/g, where one MANU (Maltogenic Amylase Novo Unit) is defined as the amount of enzyme required to release one $\mu$mol of maltose per minute at a concentration of 10 mg of maltotriose (Sigma M 8378) substrate per ml of 0.1M citrate buffer, pH 5.0 at 37° C. for 30 minutes. Preferred levels will be within the range of from about 0.25 to about 0.6% based on the dry weight of the enzyme and the weight of the flour.

Enzymes of the type disclosed by Olesen hydrolyse the non-reducing terminal chain lengths of starches and other polysaccharides by cleaving mono- and oligosaccharide units at the (1→4) $\alpha$-glucosidic linkages. Due to the nature of the process, however, it has been determined that insufficient monosaccharides can be released without excessive cost, undue process complications or adverse effect on the crumb structure. Accordingly, it is preferred to employ added monosaccharides to provide additional water binding in the crumb. Preferably, from about 5 to about 8% high fructose corn syrup, is employed.

The freshness-promoting composition also includes monoglycerides as essential. These are preferably employed in a commercially-available combination with diglycerides. It is preferred to employ from about 0.5 to about 1.5% of a mixture of mono- and diglycerides. The most preferred commercial forms will contain from about 35 to about 95% monoglycerides and typically will exhibit a capillary melting point of from about 48° to 51° C.

Despite the improvements achieved by the use of the ingredients noted above, it has been found that the overall appearance and shelf stability of the bagels can be further improved by the addition of at least one material selected from the group consisting of oil, gum, gluten, and egg solids. It is also possible to include in the dough a small but effective amount of an antimicrobial such as calcium propionate, e.g. at a level of from about 0.05 to about 0.25%, especially about 0.16%.

The various modifications to the standard bagel formula employed in this invention to retard starch retrogradation and loss of crumb moisture can decrease the tolerance of the dough to mixing and might decrease the crumb strength of the baked product, if it weren't for other modifications contemplated by this invention. For example, it has been found that the inclusion of gluten, preferably as vital wheat gluten, can provide beneficial effects. The preferred compositions will contain from about 1 to about 2% added gluten. Further, in this regard, it has been found that it is advantageous to include from about 1 to about 2% (solids basis) of at least one egg component selected from the group consisting of egg white, egg yolk, whole egg or a mixture of any of these in either fresh or dried form. Egg white, in particular, can be useful in providing tolerance in proof time. In addition to these structural components, it has been found that gums, such as vegetable gums like guar and xanthan, alone or in combination, can be effective in improving the long term texture of the crumb. The use of from about 0.22 to about 0.44% gum is, therefore, preferred.

The ingredients are mixed with flour and sufficient water in conventional fashion, depending on their function and physical form. The individual ingredients are added in amounts and in proportion to the combination, effective to yield a formable dough. The dough is mixed in a conventional dough mixer such as a BEW ™ horizontal mixer, for from about 5 to about 9 minutes, typically for 2 minutes on low followed by 5 minutes on high. Following mixing, the dough is proofed by holding it at a temperature of from about 25 to about 35° C. for about 10 to about 20 minutes, preferably at a relative humidity of at least 65%. This step develops the dough as evidenced by the evolution of carbon dioxide and the degradation of at least a portion of the starch in the flour to oligosaccharides.

Following the proofing step, the dough is formed by hand or suitable machine into bagel-shaped dough pieces. These characteristic round dough preforms with a central hole typically weigh from about 70 to about 110 grams per piece and have an outer diameter of from about 9 to about 10 centimeters. The bagels can be boiled immediately for a period of time on each side to fully gelatinize the starch in the outer skin, typically from about 30 to about 70 seconds in water at or near the boiling point.

If desired, the bagel preforms can be "retarded" by holding for a suitable period of time, such as 6 to 18 hours at from about 5° to about 10° C., as known to the art. The bagel preforms are preferably surface dried, as known, prior to baking.

The dough pieces are baked under conditions of temperature and humidity and for a time effective to brown the exterior of the dough pieces and set the internal crumb structure. Typical baking conditions will be at a temperature of from about 230° to about 290° C. and a relative humidity of from about 80 to about 90%, for from about 9 to about 13 minutes.

Following baking, the surfaces of the bagels are preferably sprayed with a solution of a preservative in an amount effective to prevent the growth of mold under ambient conditions in a moisture resistant packaging material. Potassium sorbate is a preferred preservative and is preferably sprayed onto the baked bagel in the form of an aqueous solution. Typically a solution having about 10% by weight sorbate is applied to the bagel at a sorbate level of about 0.04 to about 0.12 Baker's percent in a manner to effectively cover the entire surface area and provide an amount of from about 0.05 to about 0.1 grams of solution per square meter of surface.

The product bagels are packaged adequately to substantially maintain product moisture for at least 14 days. The bagels are preferably placed into a resealable wrapper effective to reduce moisture loss. Typically, this can be in a polyethylene bag with a twist closure.

EXAMPLES

The following examples are presented for the purpose of further illustrating and explaining the invention, and are not to be taken as limiting in any regard. Unless otherwise indicated, all parts and percentages are based on the weight of the components at the indicated stage of processing. Also, in these examples, and elsewhere in this description, all percentages are bakers percentages, i.e., based on the weight of the flour, unless otherwise noted.

Example 1

Bagels are prepared according to the present invention and compared to a control. The bagels of the invention are prepared by preparing a dough from the following ingredients and processing as follows:

TABLE 1

| INGREDIENTS | PARTS |
|---|---|
| Flour | 96 |
| High Fructose Corn Syrup | 6 |
| Sodium Chloride | 2 |
| Mono and Diglycerides | 1 |
| Enzyme | 1 |
| Vital Wheat Gluten | 1 |
| Xanthan Gum/Guar Gum | 0.28 |
| Egg Whites | 1 |
| Yeast | 1.4 |
| Dough Conditioner (Panodan ™ *) | 0.14 |
| Water | |

*A commercial mixture of diacetyl tartaric acid esters of mono- and diglycerides available from Grindstad Products, Inc. Industrial Airport, Kansas.

The dry ingredients, except for the yeast, are blended well prior to adding the water, and the yeast. The yeast is preferably slurried with water and held at 3° C. for 24 hours prior to addition. The dough is mixed for about 7 minutes and then rested by covering and holding for 10 minutes. Following resting, the dough is divided into 100 gram units and again covered and rested prior to forming into bagel-shaped preforms, each being approximately 10.16 cm in diameter. The bagel preforms are then proofed at 32° C. and 87% relative humidity for 30 minutes. The individual bagels are boiled for about 20 seconds on each side and then briefly dried under infra red heat for about 60 seconds. They are then baked at about 230° C. under moist heat for about 11 minutes. Following baking and cooling to about 71° C., the bagels are sprayed with an aqueous solution of potassium sorbate (10% by weight of solution) in an amount to provide 0.06% potassium sorbate on the bagel as a baker's percent. The bagels were then packaged in polyethylene bags with a twist closures.

Control bagels were prepared by a similar process, using a similar formulation which omitted the freshness-promoting composition of the invention. Specifically, the formulation comprised:

TABLE 2

| INGREDIENT | PARTS |
| --- | --- |
| Flour | 96 |
| Sucrose | 3 |
| Sodium Chloride | 2 |
| Yeast | 2 |

The process for preparing the control bagels was the same as that described above.

The bagels prepared in this manner were subjected to instrumental texture testing utilizing an Instron Universal Testing Machine, Model 1122. A puncture test was performed using a cylindrical stainless steel probe, 3.1 mm in diameter, to penetrate the crumb side of a freshly-sliced bagel. A chart speed of 200 mm/min, a crosshead speed of 100mm/min, and a full scale load of 2 kg (50 kg compression load cell) were used. The probe was allowed to penetrate the sample through the crumb and then through the crust. Samples were taken in the center areas of the bagel, avoiding close contact with the hole, edges, lock and air pockets. Two samples were taken per bagel half. Two bagels were tested for each experimental condition.

Analysis of the resulting instrumental texture assessment curves is briefly illustrated in FIG. 3, which expresses force (grams) on the Y-axis versus probe extension (mm) on the X-axis.

The first break in the curve indicates the point where the probe penetrates the crumb. This is designated as the crumb firmness. FIG. 1A graphically presents a summary of crumb firmness values for a bagel prepared according to the invention and a control bagel without the freshness promoting composition.

Figure 1B:
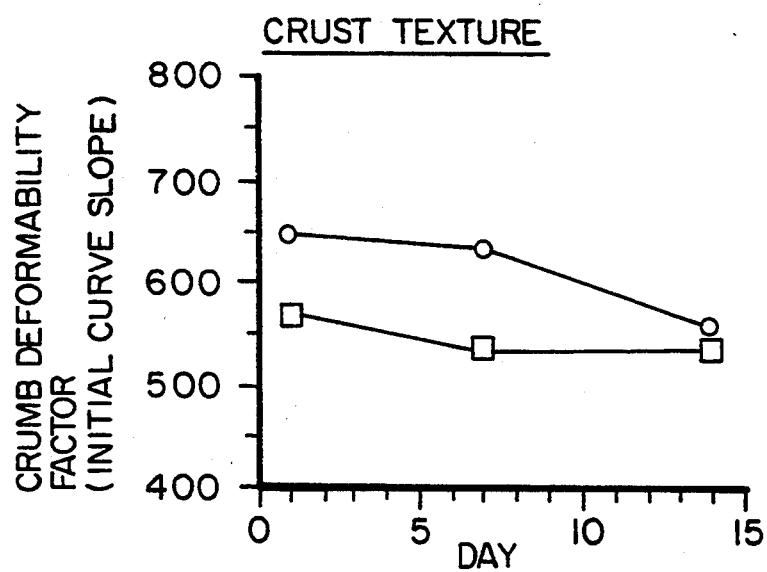

The peak force of the whole curve represents the point at which the probe breaks through the crust. This is designated as the crust toughness. FIG. 1B presents a graphical summary of results of a test of a product of the invention, as prepared above, with a control.

Figure 1C:
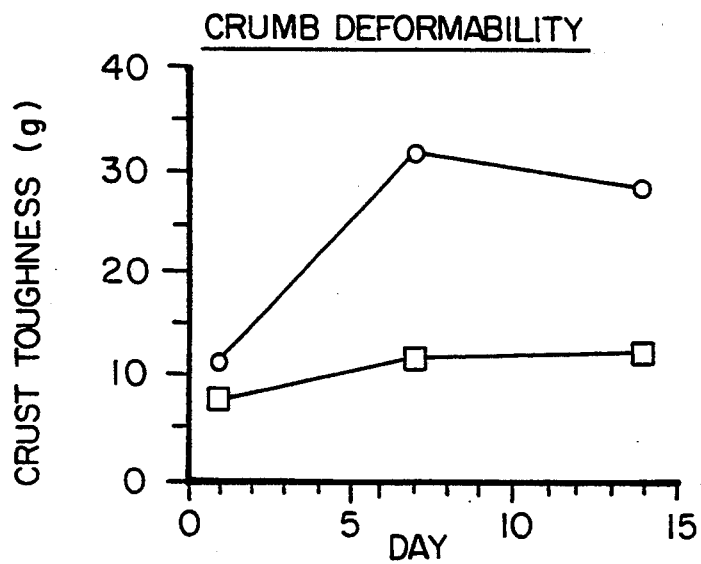

The slope of the initial curve, from the curve baseline to the crumb peak, represents the deformability factor of the bagel. As bagels stale, the slope of this curve increases because the bagel becomes less deformable. FIG. 1C presents a graphical summary of test results of a product of the invention, as prepared above, with a control.

It can be seen by comparing the ratios of crust texture to crumb texture as determined from the data represented in FIGS. 1B and 1A, respectively, that the bagels of the present invention stay above 2.5 for each time tested whereas those of the control drop to below 2.0. The higher this number is, the higher the textural contrast is. Bagels which exhibit reasonable softness values and a good textural contrast, are acceptable texturally.

The graph in FIG. 2 is a representation of instrumentally-derived data on a grid determined by sensory evaluation to provide an objective basis for comparing the subjective sensory test results. The graph plots peak force against initial curve slope results for bagels evaluated at days 0, 5, 10, and 14. Based on these results, it can be seen that the bagels prepared with the freshness-promoting composition of the invention remain acceptable well beyond the time when conventionally-prepared bagels become too hard to eat with enjoyment.

The above description is intended to enable the person skilled in the art to practice the invention. It is not intended to detail all of the possible modifications and variations which will become apparent to the skilled worked upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

We claim:

1. A process for preparing a bagel exhibiting freshness for extended periods of storage under ambient conditions, comprising:

preparing a dough by mixing flour, water, yeast, and salt, and a freshness-promoting combination of from about 0.25 to about 0.6% (at an activity of 1500 MANU/g) starch degrading enzyme resistant to inactivation by heat up to temperatures of at least about 82° C., from about 0.5 to about 1.5% mono- and di-glycerides, from about 5 to about 8% high fructose corn syrup, from about 0.22 to about 0.44% gum, from about 1 to about 2% added gluten, and from about 1 to about 2% (solids basis) of at least one egg component selected from the group consisting of egg white, egg yolk, whole egg or a mixture of any of these in either fresh or dried form, the ingredients being present in proportions effective to produce a formable dough, and all percentages being based on the weight of the flour;

holding the dough under conditions of temperature and humidity for a time effective to develop the dough as evidenced by the evolution of carbon dioxide and the degradation of at least a portion of the starch in the flour to oligosaccharides;

forming the dough into bagel-shaped dough pieces;

boiling the dough pieces;

baking the dough pieces under conditions of temperature and humidity and for a time effective to brown the exterior of the dough pieces and set the internal crumb structure;

spraying the surface of the bagel with a solution of an antimycotic following baking in an amount effective to prevent the growth of mold under ambient conditions in a moisture resistant packaging material; and packaging the bagel in a resealable wrapper effective to reduce moisture loss.

* * * * *